United States Patent
Oh et al.

(10) Patent No.: US 8,588,280 B2
(45) Date of Patent: Nov. 19, 2013

(54) ASYMMETRIC COMMUNICATION ON SHARED LINKS

(75) Inventors: Kyung Suk Oh, Cupertino, CA (US); John Wilson, Raleigh, NC (US); Frederick A. Ware, Los Altos Hills, CA (US); WooPoung Kim, Plano, TX (US); Jade M. Kizer, Windsor, CO (US); Brian S. Leibowitz, San Francisco, CA (US); Lei Luo, Durham, NC (US); John Cronan Eble, Chapel Hill, NC (US)

(73) Assignee: Rambus Inc., Sunnyvale, CA (US)

( * ) Notice: Subject to any disclaimer, the term of this patent is extended or adjusted under 35 U.S.C. 154(b) by 102 days.

(21) Appl. No.: 12/809,000

(22) PCT Filed: Dec. 19, 2008

(86) PCT No.: PCT/US2008/087743
§ 371 (c)(1),
(2), (4) Date: Aug. 23, 2010

(87) PCT Pub. No.: WO2009/086142
PCT Pub. Date: Jul. 9, 2009

(65) Prior Publication Data
US 2010/0309964 A1    Dec. 9, 2010

Related U.S. Application Data

(60) Provisional application No. 61/014,821, filed on Dec. 19, 2007.

(51) Int. Cl.
  H04B 1/38     (2006.01)
  H04L 5/16     (2006.01)
(52) U.S. Cl.
  USPC .......................... 375/219; 375/259
(58) Field of Classification Search
  USPC ..................... 375/259, 219
  See application file for complete search history.

(56) References Cited

U.S. PATENT DOCUMENTS

2003/0048210 A1 * 3/2003 Kiehl ........................ 341/102
2006/0132335 A1   6/2006 Kojima

* cited by examiner

*Primary Examiner* — Shuwang Liu
*Assistant Examiner* — Nader Bolourchi

(57) ABSTRACT

Embodiments of a system that communicates bidirectional data between two devices via shared links is described. In this system, data is transmitted on the shared links by one of the devices using single-ended drivers, and corresponding symbols are received on the shared links by the other device using differential comparison circuits. The data may be encoded as a series of parallel codewords prior to transmission. Each shared link may communicate a respective symbol in each codeword, which can have one of two possible logical values (e.g., a logic 0 or a logic 1). The corresponding symbols received by the other device may comprise a parallel symbol set, and each of the differential comparison circuits may compare symbols received on pairs of the shared links. A decoder in the other device may decode a respective parallel symbol set from the outputs of the differential comparison circuits to recover the encoded data.

22 Claims, 7 Drawing Sheets

| DATA VALUE | 9 | 12 | 15 | 8 | 11 | 14 | 7 | 5 | 4 | 1 |
|---|---|---|---|---|---|---|---|---|---|---|
| DQ[3] | 1 | 1 | 1 | 1 | 1 | 1 | 0 | 0 | 0 | 0 |
| DQ[2] | 0 | 1 | 1 | 0 | 1 | 1 | 1 | 1 | 1 | 0 |
| DQ[1] | 0 | 0 | 1 | 0 | 0 | 1 | 1 | 0 | 0 | 0 |
| DQ[0] | 1 | 0 | 1 | 0 | 1 | 0 | 1 | 1 | 0 | 1 |
| a | 1 | 0 | 0 | 1 | 0 | 0 | 1 | 1 | 1 | 1 |
| b | 0 | 1 | 1 | 0 | 1 | 1 | 0 | 0 | 0 | 1 |
| c | 0 | 1 | 0 | 0 | 1 | 0 | 0 | 1 | 1 | 0 |
| d | 0 | 0 | 0 | 1 | 0 | 1 | 1 | 0 | 1 | 1 |
| e | 1 | 0 | 1 | 0 | 1 | 0 | 1 | 1 | 0 | 0 |
| f | 1 | 1 | 1 | 1 | 0 | 1 | 0 | 0 | 0 | 0 |
| CW | 9 | 12 | 15 | 8 | 11 | 14 | 7 | 5 | 4 | 1 |
| | T0 | T1 | T2 | T3 | T4 | T5 | T6 | T7 | T8 | T9 |

| CW# | 9 | 12 | 15 | 8 | 11 | 14 | 7 | 5 | 4 | 1 |
|---|---|---|---|---|---|---|---|---|---|---|
| SAab | 1 | 0 | 0 | 1 | 0 | 0 | 1 | 1 | 1 | x |
| SAac | 1 | 0 | x | 1 | 0 | x | 1 | x | x | 1 |
| SAad | 1 | x | x | x | x | 0 | x | 1 | x | x |
| SAae | x | x | 0 | 1 | 0 | x | x | x | 1 | 1 |
| SAaf | x | 0 | 0 | x | x | 0 | 1 | 1 | 1 | 1 |
| SAbc | x | x | 1 | x | x | 1 | x | 0 | 0 | 1 |
| SAbd | x | 1 | 1 | 0 | 1 | x | 0 | x | 0 | x |
| SAbe | 0 | 1 | x | x | x | 1 | 0 | 0 | x | 1 |
| SAbf | 0 | x | x | 0 | 1 | x | x | x | x | 1 |
| SAcd | x | 1 | x | 0 | 1 | 0 | 0 | 1 | x | 0 |
| SAce | 0 | 1 | 0 | x | x | x | 0 | x | 1 | x |
| SAcf | 0 | x | 0 | 0 | 1 | 0 | x | 1 | 1 | x |
| SAde | 0 | x | 0 | 1 | 0 | 1 | x | 0 | 1 | 1 |
| SAdf | 0 | 0 | 0 | x | x | x | 1 | x | 1 | 1 |
| SAef | x | 0 | x | 0 | 1 | 0 | 1 | 1 | x | x |
| | T0 | T1 | T2 | T3 | T4 | T5 | T6 | T7 | T8 | T9 |

FIG. 3A

ASYMMETRIC COMMUNICATION ON SHARED LINKS

TECHNICAL FIELD

Digital communication systems convey data over one or more conductors as varying voltages or currents that represent the data as series of symbols. Over a single wire, for example, relatively low and high voltages can be used to represent a logic '0' and a logic '1,' respectively. (This form of signaling is commonly referred to as 'single-ended signaling.' Also common, 'differential signaling' conveys logic '0' and '1' using complementary voltages on pairs of signal wires.) The bandwidth of a given communication channel is generally limited by the speed at which voltage or current expressing the '0' or '1' symbols can transition between logic levels (e.g., between relatively high and low voltages or currents).

Multi-wire communication (which is also referred to as 'vector signaling') has been proposed as a way to increase channel bandwidth. As used herein, 'vector signaling' refers to encoding methods in which successive sets of N symbols are each encoded into an M-symbol vector, where M is greater than N. Each of the N symbols is encoded such that decoding any given symbol requires consideration of more than two symbols in each codeword, or 'vector.' In contrast, decoding a single-ended signal requires consideration of just one level against a reference, and decoding differential signals requires consideration of just two complementary levels. Decoding vector signals thus requires relatively more complex receive circuitry as compared with single-ended or differential signals. Furthermore, this added complexity grows rapidly as the number of wires increases. For example, many proposed multi-wire communication techniques include $M(M-1)/2$ amplifiers at the receiver, where M is the number of symbols in each codeword and is the number of wires. Thus, for six wires there may be 15 amplifiers, for eight wires there may be 28 amplifiers, and for ten wires there may be 45 amplifiers. This large number of amplifiers increases the complexity, power consumption and cost of the receiver. Moreover, parasitic capacitance on the wires increases as the number of amplifiers is increased, which can, paradoxically, reduce the communication bandwidth.

BRIEF DESCRIPTION OF THE FIGURES

FIG. 3A is a symbol table illustrating how an embodiment of a decoder of FIG. 1 implements the coding technique of Table 1 to decode parallel random symbol sets S[5:0] conveyed on links a through f.

DETAILED DESCRIPTION

Figure 1:
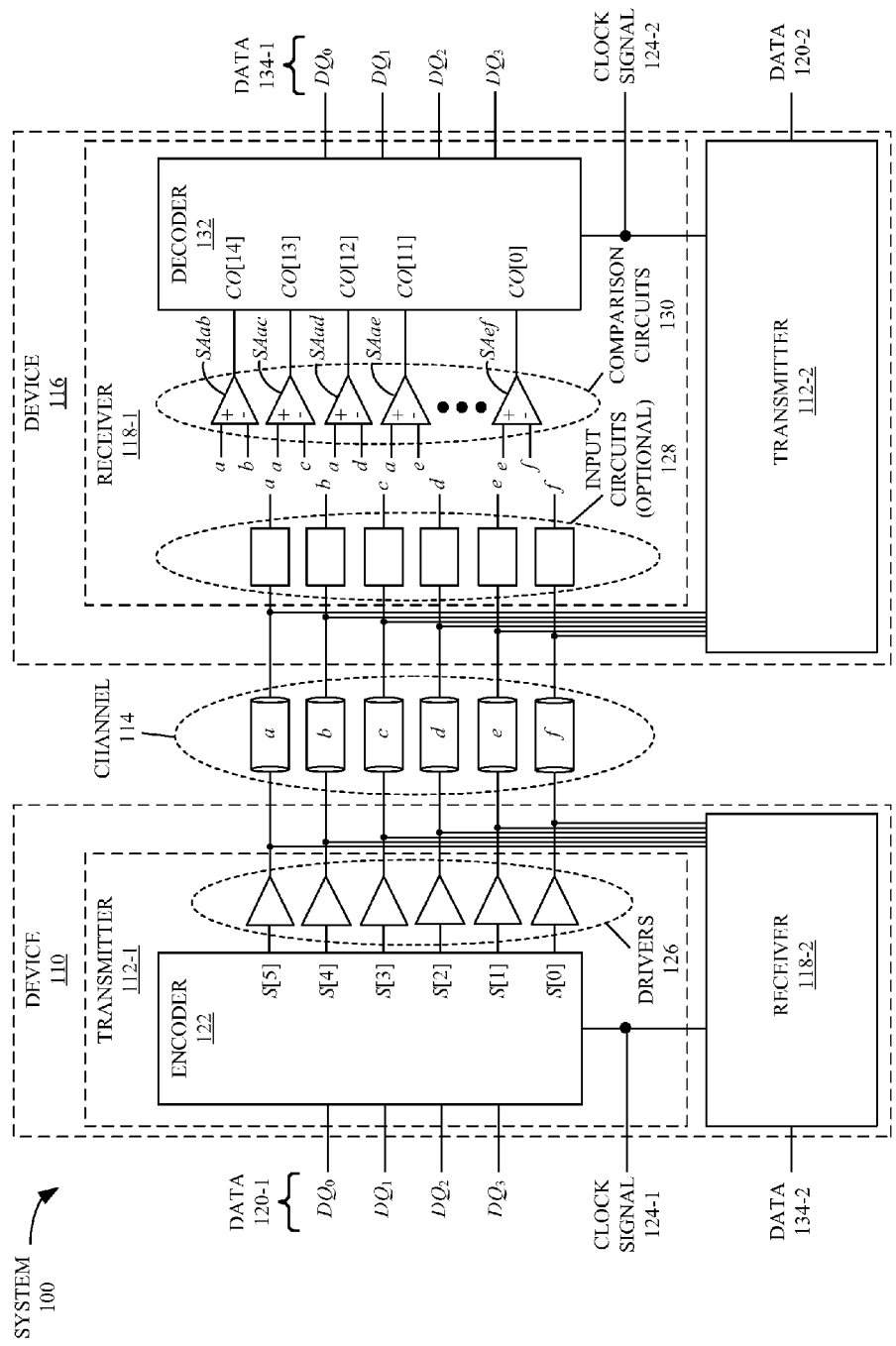
FIG. 1 is a block diagram illustrating a system that encodes and decodes four-bit data DQ[3:0] in accordance with one embodiment.

FIG. 1 presents a block diagram illustrating a system 100 that includes a device 110 that includes a transmitter 112-1 and a device 116 that includes a receiver 118-1 connected by a communication channel 114. A vector encoder 122 encodes four-bit data DQ[3:0] 120-1 into a series of parallel codewords S[5:0] for transmission over corresponding links a, b, c, d, e and f of the channel. Each codeword S[5:0] is expressed as two sets of equal-length symbols, one representing logic 0s on a first group of links (e.g., S[4:2]=000 on links b, c and d of channel 114) and another representing logic is on the remaining links (e.g., S[5]=1 on link a and S[1:0]=11 on links e and f). Thus, each codeword is balanced in the number of logic 0s and 1s. Comparison circuits 130 in receiver 118-1 include sense amplifiers SA that compare the parallel symbols received on each pair of links a, b, c, d, e and f, and provide outputs to a decoder 132. The decoder decodes the outputs from comparison circuits 130. Similarly, transmitter 112-2 in device 116 encodes four-bit data DQ[3:0] 120-2 into a series of parallel codewords S[5:0] for transmission over corresponding links a, b, c, d, e and f of the channel, and receiver 118-2 in device 110 receives and decodes the received symbols.

Using the communication from device 110 to device 116 as an illustration, encoder 122 encodes four-bit data DQ[3:0] 120-1 sampled on edges of an internal or external clock signal 124-1. The resulting codewords S[5:0] are provided as amplitude-modulated signals by single-ended drivers 126 (or an equivalent means for outputting) onto links a through f. In a typical example, transmitter 112-1 and receiver 118-1 are on respective integrated circuits (ICs), such as a memory IC and a memory controller IC, respectively. The following discussion refers to elements a through f alternatively as 'links' or 'nodes.' The former refers to the entire AC- or DC-coupled signal path between encoder 122 and comparison circuits 130, whereas the latter refers to an input or output pin, wire, or terminal.

Comparison circuits 130 include fifteen differential sense amplifiers SA in this example, which compare all $M(M-1)/2$ pairings of the received symbols on links a through f (in general, comparison circuits 130 include sense amplifiers or comparators, such as differential or single-ended amplifiers). The label for each sense amplifier includes two lowercase characters that correspond to the compared input nodes. For example, sense amplifier SAab compares input nodes a and b from like-named links of channel 114. Decoder 132 samples the outputs from comparison circuits 130 on edges of a clock signal 124-2 and decodes the resultant sample sets to recover data DQ[3:0] 134-1.

Because the links a through f are shared by transmitters 112 and receivers 118, data 120 is communicated between devices 110 and 116 using half-duplex communication. Furthermore, in this example, where transmitters 112 are identical and receivers 118 are identical, the communication bandwidth in each direction is the same. The use of shared links a through f in conjunction with vector (or "multi-wire") signaling provides increased communication bandwidth while reducing the complexity and power consumption of receivers 118.

Table 1 illustrates a codespace with twenty balanced codewords, which have an equal number of 0s and 1s, and which may be communicated in parallel across six links or nodes. (For six links and binary symbols in each codeword, there are a total of 64 possible codewords, most of which are not balanced. The twenty balanced codewords are more than sufficient to communicate four bits, which requires 16 combinations.) For example, for codeword nine (CW#9), data DQ[3:0] 120-1 is 1001 and is encoded as S[5:0] of 100011.

interval is encoded into a corresponding codeword. Beginning at time T0, the first data 1001 is expressed using codeword nine (CW#9), which has symbols S[5:0]=100011. Then, at time T1, data 1100 is expressed using codeword twelve (CW#12), which has symbols S[5:0]=011001. Next, at time T2, data 1111 is expressed using codeword fifteen (CW#15), which has symbols S[5:0]=010011. This process is continued in subsequent time intervals.

Figures 2A, 2B:
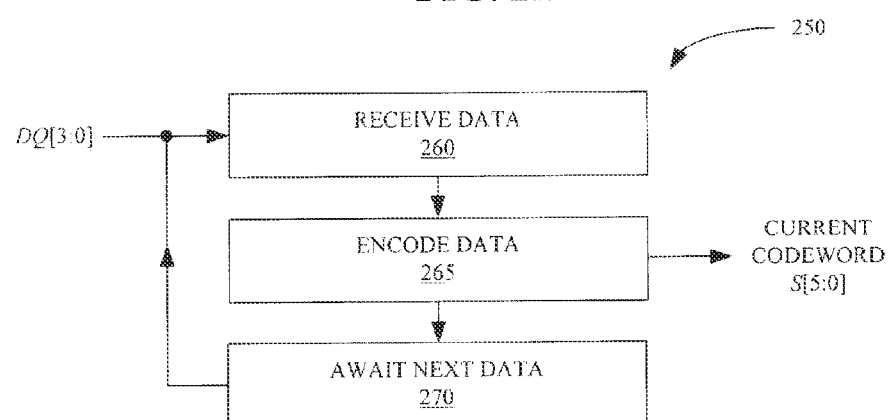
FIG. 2A is a symbol table illustrating how an embodiment of an encoder of FIG. 1 implements the coding technique of Table 1 to encode a random sequence of four-symbol data patterns DQ[3:0] into a series of parallel symbol sets S[5:0] to be conveyed on links a through f.
FIG. 2B is a flowchart depicting the operation of an encoder of FIG. 1 in accordance with the coding technique of Table 1.

FIG. 2B presents a flowchart 250 depicting the operation of encoder 122 of FIG. 1 in accordance with the coding technique of Table 1. Beginning the encoding sequence at opera-

TABLE 1

| Codeword Number (CW#) | Data DQ[3:0] 120-1 | Codeword S[5:0] for links a b c d e f | Comparison Circuits 130 Outputs a-b\|a-c\|a-d\|a-e\|a-f\|b-c\|b-d\|b-e\|b-f\|c-d\|c-e\|c-f\|d-e\|d-f\|e-f |
|---|---|---|---|
| 0 | 0000 | 1 1 1 0 0 0 | x\|x\|1\|1\|1\|x\|1\|1\|1\|1\|1\|1\|x\|x\|x |
| 1 | 0001 | 1 1 0 1 0 0 | x\|1\|x\|1\|1\|1\|x\|1\|1\|0\|x\|x\|1\|1\|x |
| 2 | 0010 | 1 1 0 0 1 0 | x\|1\|1\|x\|1\|1\|1\|1\|x\|1\|x\|0\|x\|0\|x\|1 |
| 3 | 0011 | 1 1 0 0 0 1 | x\|1\|1\|1\|1\|x\|1\|1\|1\|1\|x\|x\|x\|0\|x\|0\|0 |
| 4 | 0100 | 1 0 1 1 0 0 | 1\|x\|x\|1\|1\|0\|0\|x\|x\|x\|1\|1\|1\|1\|x |
| 5 | 0101 | 1 0 1 0 1 0 | 1\|x\|1\|x\|1\|0\|x\|0\|x\|1\|x\|1\|0\|x\|1 |
| 6 | 0110 | 1 0 1 0 0 1 | 1\|x\|1\|1\|1\|x\|0\|x\|x\|0\|1\|1\|1\|x\|x\|0\|0 |
| 7 | 0111 | 1 0 0 1 1 0 | 1\|1\|x\|x\|1\|x\|0\|0\|x\|0\|0\|x\|x\|1\|1 |
| 8 | 1000 | 1 0 0 1 0 1 | 1\|1\|x\|1\|x\|x\|0\|x\|0\|0\|x\|0\|1\|1\|x\|0 |
| 9 | 1001 | 1 0 0 0 1 1 | 1\|1\|1\|x\|x\|x\|x\|0\|0\|x\|0\|0\|0\|0\|x |
| 10 | 1010 | 0 1 1 1 0 0 | 0\|0\|0\|0\|x\|x\|x\|x\|1\|1\|1\|x\|1\|1\|1\|1\|x |
| 11 | 1011 | 0 1 1 0 1 0 | 0\|0\|x\|0\|x\|x\|1\|x\|1\|1\|1\|x\|1\|0\|x\|1 |
| 12 | 1100 | 0 1 1 0 0 1 | 0\|0\|x\|x\|0\|x\|1\|1\|x\|1\|1\|1\|x\|x\|0\|0 |
| 13 | 1101 | 0 1 0 1 1 0 | 0\|x\|0\|0\|x\|1\|x\|x\|1\|1\|0\|0\|x\|x\|1\|1\|1 |
| 14 | 1110 | 0 1 0 1 0 1 | 0\|x\|0\|x\|0\|1\|x\|1\|x\|1\|x\|0\|x\|0\|1\|1\|x\|0 |
| 15 | 1111 | 0 1 0 0 1 1 | 0\|x\|0\|x\|x\|1\|1\|1\|x\|x\|x\|0\|0\|0\|0\|x |
| 16 | — | 0 0 1 1 1 0 | x\|0\|0\|0\|x\|0\|0\|0\|x\|x\|x\|1\|x\|1\|1 |
| 17 | — | 0 0 1 1 0 1 | x\|0\|0\|x\|0\|0\|0\|x\|0\|x\|1\|x\|1\|x\|0 |
| 18 | — | 0 0 1 0 1 1 | x\|0\|x\|0\|0\|0\|x\|0\|0\|0\|x\|x\|0\|0\|x |
| 19 | — | 0 0 0 1 1 1 | x\|x\|0\|0\|0\|x\|0\|0\|0\|0\|0\|0\|x\|x\|x |

As shown in Table 1, each of sense amplifiers SA in comparison circuits 130 can have one of three cases. For example, sense amplifier SAac, which receives inputs a and c, outputs:

1. a voltage representative of a logic 0 (e.g., a negative voltage −Vp) when symbols S[5] and S[3] on respective nodes a and c express logic values of 0 and 1, respectively;
2. a voltage representative of a logic 1 (e.g., a positive voltage +Vp) when nodes a and c express logic values of 1 and 0, respectively; and
3. either one of the voltages representing logic 0 or 1. These entries are marked 'x' as the decoder does not require these values. This is the case when nodes a and c express the same logic values.

Each codeword of Table 1 provides a nine accurate entries and decoder 132 decodes the encoded four-bit data DQ[3:0] 134-1 from these nine entries and their locations. As detailed below, in one embodiment decoder 132 takes advantage of redundancy in the outputs from the sense amplifiers SA for different codewords to reduce the required number of sense amplifiers. Reducing the number of sense amplifier reduces capacitive loading on the links, and thus improves speed performance and reduces power consumption.

FIG. 2A presents a symbol table 200 illustrating how an embodiment of encoder 122 of FIG. 1 implements the coding technique of Table 1 to encode a sequence of four-symbol data patterns DQ[3:0] 120-1 into a series of parallel symbol sets S[5:0]. As noted previously, the bit positions of symbols S[5:0] correspond to respective links a, b, c, d, e and f (e.g., S[5] is the logic value expressed on link a). In the series of time intervals T0-T9 of FIG. 2A, data DQ[3:0] in each time tion 260, encoder 122 receives data DQ[3:0] 120-1. Then, at operation 265, encoder 122 encodes data DQ[3:0] 120-1 as a corresponding codeword in accordance with Table 1, for example using a lookup table implemented in a RAM, ROM or by combinational logic, and outputs the symbols in the codeword S[5:0]. Next, at operation 270, encoder 122 awaits the next sequence of data DQ[3:0] 120-1. The flow of operations 260 through 270 repeats for each successive codeword.

FIG. 3A presents a symbol table 300 illustrating how an embodiment of decoder 132 of FIG. 1 implements the coding technique of Table 1 to decode received parallel symbol sets S[5:0] into data D Q[3:0] 134-1. Decoder 132 receives outputs from comparison circuits 130 as a series of fifteen-symbol sets CO[14:0], and determines the corresponding codeword (and thus, data DQ[3:0] 134-1) in accordance with Table 1. In the series of time intervals T0-T9 of FIG. 3A, parallel symbol set S[5:0] in each time interval is decoded into corresponding data DQ[3:0] 134-1. Beginning at time T0, sense amplifier outputs SAab=1, SAac=1, SAad=1, SAae=x, SAaf=x, SAbc=x, SAbd=x, SAbe=0, SAbf=0, SAcd=x, SAce=0, SAcf=0, SAde=0, SAdf=0 and SAef=x specify codeword nine (CW#9), which represents data DQ[3:0] 134-1 of 1001. Then, at time T1, sense amplifier outputs SAab=0, SAac=0, SAad=x, SAae=x, SAaf=0, SAbc=x, SAbd=1, SAbe=1, SAbf=x, SAcd=1, SAce=1, SAcf=x, SAde=x, SAdf=0 and SAef=0 specify codeword twelve (CW#12), which represents data DQ[3:0] 134-1 of 1100. Next, at time T2, sense amplifier outputs SAab=0, SAac=x, SAad=x, SAae=0, SAaf=0, SAbc=1, SAbd=1, SAbe=x, SAbf=x, SAcd=x, SAce=0, SAcf=0, SAde=0, SAdf=0 and SAef=x specify codeword fifteen (CW#15), which represents data DQ[3:0] 134-1 of 1111. This process is continued in subsequent time intervals.

For each codeword, x values represents "don't cares" which could be representative of either a 0 or a 1, but the other, non-x values provide sufficient information to uniquely identify each codeword, and thus each CW #. With reference to CW#9 in Table 1, no set of outputs has the same 1 and 0 positions irrespective of the value taken for each x value. For example, comparing CW#9 with CW#8, the x values can be assigned to make all but the third to last comparison equal. This third to last value is thus sufficient to distinguish CW#9 from CW#8. The remaining codewords likewise include at least one assuredly different comparison output.

Figure 3B:
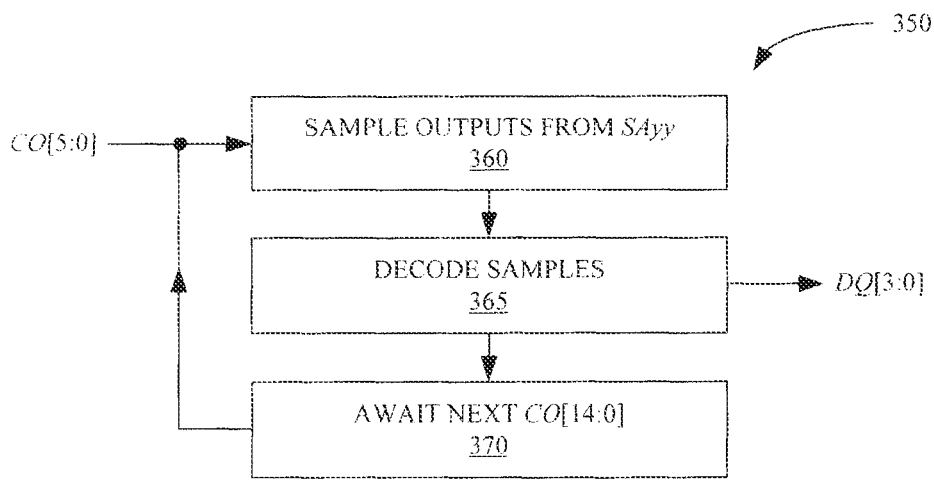
FIG. 3B is a flowchart depicting the operation of a decoder of FIG. 1 in accordance with the coding technique of Table 1.

FIG. 3B presents a flowchart 350 depicting the operation of decoder 132 of FIG. 1 in accordance with the coding technique of Table 1. Beginning the decoding sequence at operation 360, decoder 132 samples the outputs from sense amplifiers SAyy for each codeword. Then, at operation 365, decoder 132 decodes them, for example using a lookup table implemented in a RAM, ROM or by combinational logic, to produce the encoded data DQ[3:0] 134-1. Next, at operation 370, decoder 132 awaits the next series of fifteen-symbol sets CO[14:0]. The flow of operations 360 through 370 repeats for each successive parallel symbol set.

Figure 4A:
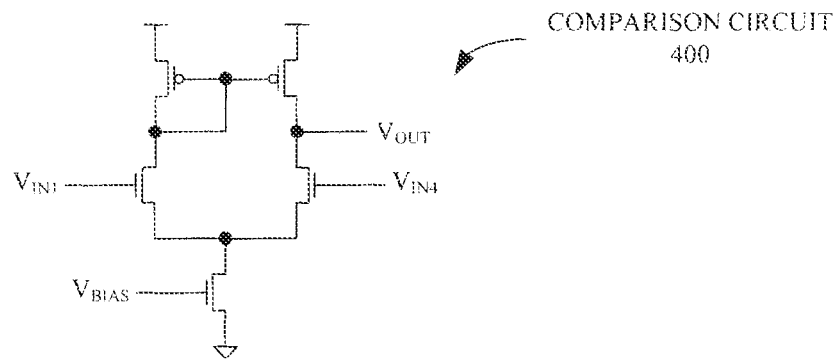
FIG. 4A is a block diagram illustrating a comparison circuit that compares symbols received on a pair of links in FIG. 1 in accordance with one embodiment.
Figure 4B:
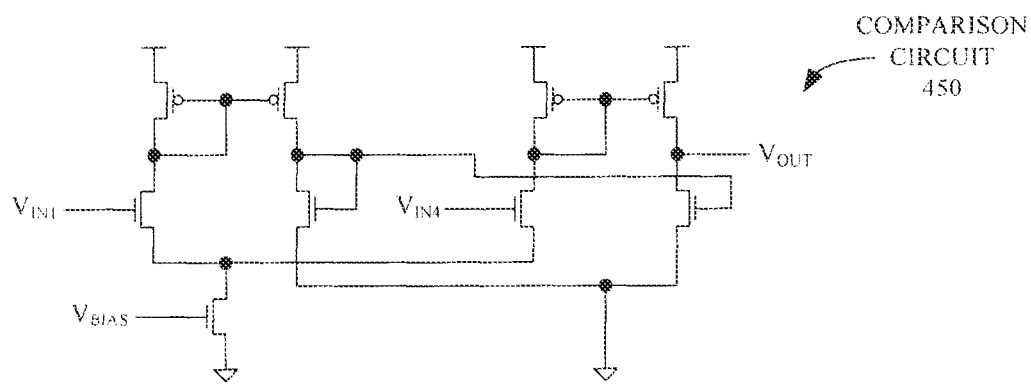
FIG. 4B is a block diagram illustrating a comparison circuit that compares symbols received on a pair of links in FIG. 1 in accordance with one embodiment.

FIG. 4A depicts a comparison circuit 400 and FIG. 4B depicts a comparison circuit 450 that each compare symbols received on a pair of links, such as one of comparison circuits 130 (FIG. 1), in accordance with other embodiments. Comparison circuits 400 (FIG. 4A) and 450 can be implemented using NMOS transistors, PMOS transistors or both.

Returning to FIG. 1, device 116 can be a memory controller and device 110 a memory IC that includes one or more arrays of dynamic, random-access memory (DRAM). Integrated memory controllers typically include more metal layers than DRAM ICs, and the input nodes on DRAM ICs are typically closer to the substrate. Consequently, the input capacitance associated with receiver 118-1 can be expected to be lower than that of receiver 118-2 in such embodiments. As a consequence, if N-M coding is used when communicating data DQ[3:0] 120-2 on links a through f to device 110, the memory IC in this embodiment, the additional capacitance associated with on-chip routing and the multiple sense amplifiers SA in receiver 118-2 may reduce the communication bandwidth relative to the communication bandwidth when data DQ[3:0] 120-1 is communicated on links a through f to device 116.

One embodiment uses an asymmetric coding scheme to addresses this problem. In particular, a different coding technique (for example, based on a different codespace) is implemented in encoder 122 and decoder 132 than the coding technique implemented in the corresponding encoder and decoder in transmitter 112-2 and receiver 118-2, respectively. This asymmetric coding can reduce the number of sense amplifiers SA in receiver 118-2 in order to reduce the capacitance, and thus, increase the communication bandwidth between device 116 and 110 (such as from 3.3 to 4.3 GHz). For example, as described previously encoder 122 may implement 4-6 encoding and decoder 132 may implement 15-4 decoding, while the corresponding encoder in transmitter 112-2 may implement 4-6 encoding and the decoder in receiver 118-2 may implement 6-4 decoding. Thus, vector signaling may be used for communication from device 110 to device 116, while a different communication technique may be used from device 116 to device 110. Other coding techniques that may be implemented by transmitter 112-2 and receiver 118-2 include one or more of: a code that includes Dynamic Bus Inversion (or Data Bus Inversion), or for two sets of transmitters like 112-1 and two sets of receivers like 118-1 an 8-10 code, an 8-9 code and an 8-11 code may also be used.

Drivers in either of transmitters 112 can be designed single-ended drivers in which individual drivers sink the current independently. In other embodiments, all drivers in transmitters 112 may share one current among them in order to minimize current peaks in power supply due to any driver mismatches, such as driver strength, switching incidents, etc. In some embodiments, one or more of these drivers may have a different gain value or weighting W, than the other drivers. While the same links a through f have been used during bidirectional communication in system 100 in other embodiments communication in a respective direction uses different links (for example, in another instance of channel 114) or a different number of links than for communication in the other direction.

Additional techniques can be used to reduce the capacitance associated with receivers 118. For example, optional input circuits 128 may be coupled between links a through f and comparison circuits 130. These optional input circuits 128 may include one or more of: a buffer (such as a voltage follower), a pre-amplifier, a linear equalizer and another equalizer (such as a Decision Feedback Equalizer). One or more of these components shield the input nodes from the capacitance associated with the receivers 118 (thus the input capacitance of a memory controller may be reduced to 600 fF and the input capacitance of a memory IC may be reduced to 1000 fF). For example, buffers may be used to drive a received parallel symbol set onto wires in device 116, which may compensate for any loading or attenuation resulting from the on-chip routing and the capacitance associated with comparison circuits 130.

While the sense amplifiers SA in comparison circuits 130 of FIG. 1 are differential amplifiers in this example, in other embodiments optional input circuits 128, at least a portion of the comparison circuits 130, or both, are single-ended (for example, a first stage of the comparison circuits may be single-ended and a subsequent stage may be differential). These single-ended amplifiers each may compare a respective symbol on a respective link to an internal reference voltage, such as a supply voltage or ground of a respective single-ended amplifier (as opposed to comparing the respective symbol to a reference voltage that is provided by device 110). The use of single-ended amplifiers may reduce the number of amplifiers coupled to each of the links (in the example of FIG. 1, from fifteen sense amplifiers, SA, coupled to the links to six single-ended amplifiers), and thus the capacitance associated with a respective receiver.

Figure 5A:
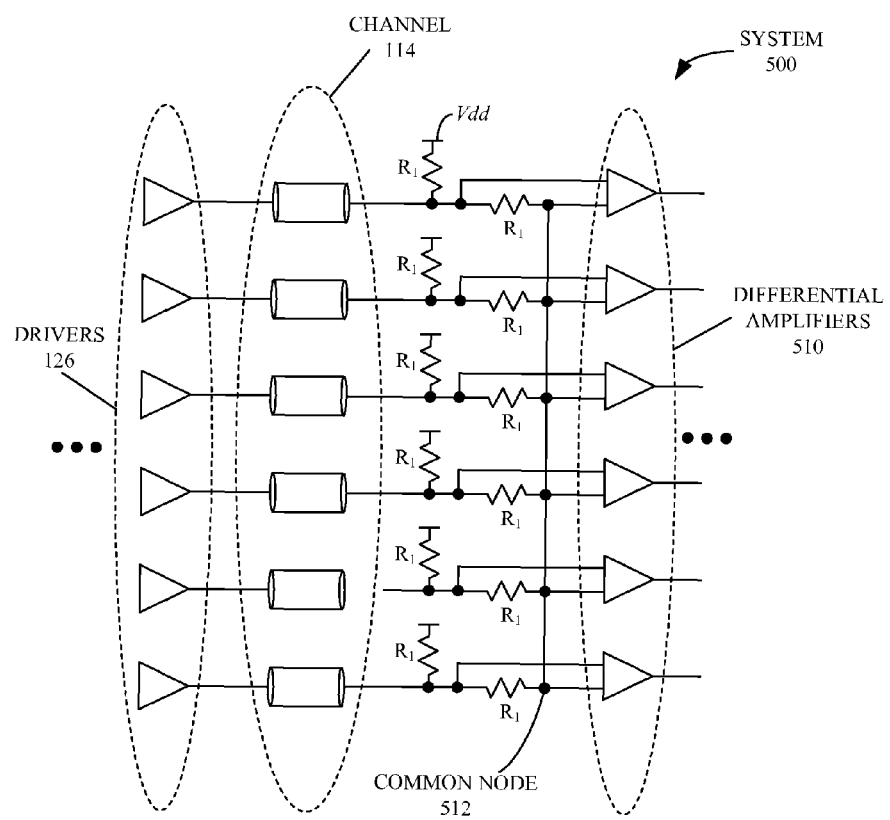
FIG. 5A is a block diagram illustrating a system that communicates data in accordance with one embodiment.

In some embodiments, the comparison circuits 130 of FIG. 1 include differential amplifiers that compare each of the symbols in a respective parallel symbol set, which is received on links a through f, to a reference voltage that may be generated on-chip (i.e., on the IC) or off-chip. If the reference voltage is generated on-chip, the reference voltage may be better able to track noise signals that occur during communication between devices 110 and 116, which often limit the performance of systems that include differential amplifiers that perform comparisons to a common reference voltage. On-chip generation of the reference voltage is shown in FIG. 5A, which presents a system 500 that communicates data in accordance with another embodiment. System 500 is similar to system 100, with like-identified elements being the same or similar.

In system 500, a suitable reference voltage is obtained by partially terminating all of the links in channel 114 to a common node 512 of differential amplifiers 510. Furthermore, by terminating half of the termination to this common node (e.g., with $R_1=100\Omega$), a tracking bandwidth of the reference voltage greater than 1 GHz may be obtained. This termination technique reduces reflections due to improper modal termination, and reduces power consumption because part of the signaling current is returned back through common node 512 of the reference-voltage network.

If a balanced code is used (or, for non-balanced codes, if the number of logic 0s and the number of logic 1s during a respective time interval is constant), noise due to simultaneous switching outputs (SSOs) can be reduced or eliminated. In addition, by partially terminating to common node 512, any noise generated at the transmit side of the channel 114 (for example, in drivers 126) is coupled to the receive side by the links in channel 114, and thus is coupled to the high-bandwidth reference-voltage network. Consequently, this noise is common to all of the links and common node 512, so it can be rejected by a pseudo-differential receiver circuit, such as differential amplifiers 510, each of which has one input coupled to the reference voltage and the other input driven by the symbol received on a respective one of the links.

Figure 5B:
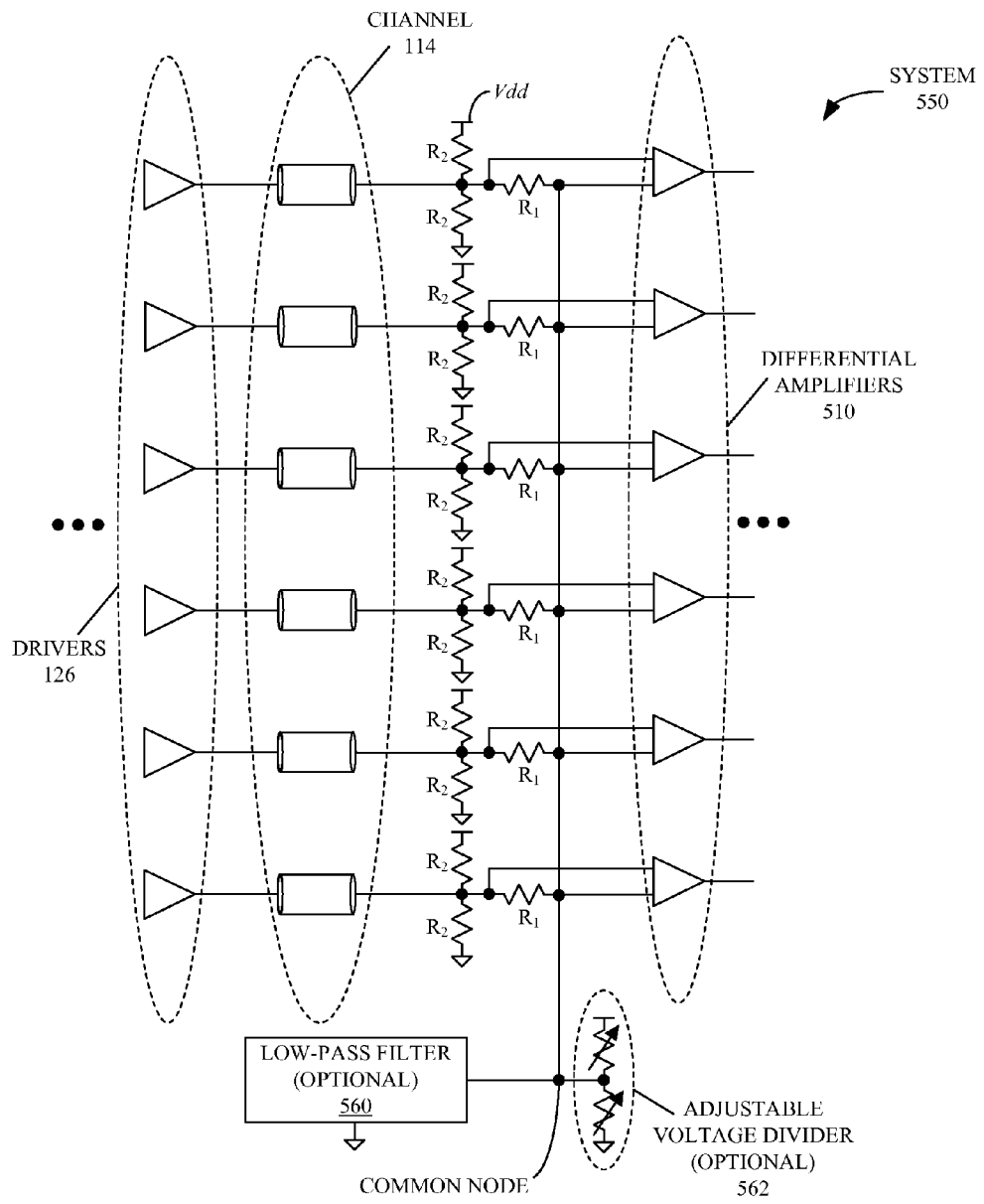
FIG. 5B is a block diagram illustrating a system that communicates data in accordance with one embodiment.

FIG. 5B presents a system 550 that communicates data in accordance with another embodiment, in which the termination is split between Vdd, ground and common node 512. System 550 is similar to system 100 (FIG. 1), with like-identified elements being the same or similar. This system extracts the reference voltage, tracks noise, and reduces power consumption associated with signaling and termination.

If balanced coding is used in system 500 (FIG. 5A) and 550, and all of the symbols in a respective parallel symbol set arrive at approximately the same time (if there is no skew), common node 512 in these circuits is a virtual ground. In this case, the termination may match the impedance of the links and the impedance of drivers 126 (for example, $R_1$ may be $100\Omega$ and $R_2$ may be $200\Omega$).

In order to adjust the reference voltage for a global offset in differential amplifiers 510, system 550 may include an optional adjustable voltage divider 562 in parallel with common node 512. Furthermore, if there are large length mismatches in the links, the different arrival times of the symbols in a respective parallel symbol set may result in voltage movement of the virtual ground in the reference-voltage network. One solution for this problem is to adjust the transmission times of drivers 126 to compensate for the resulting skew. Another solution, which can be used separately or in combination with the skew compensation, is to include an optional low-pass filter 560 in parallel with common node 512.

Figure 6:
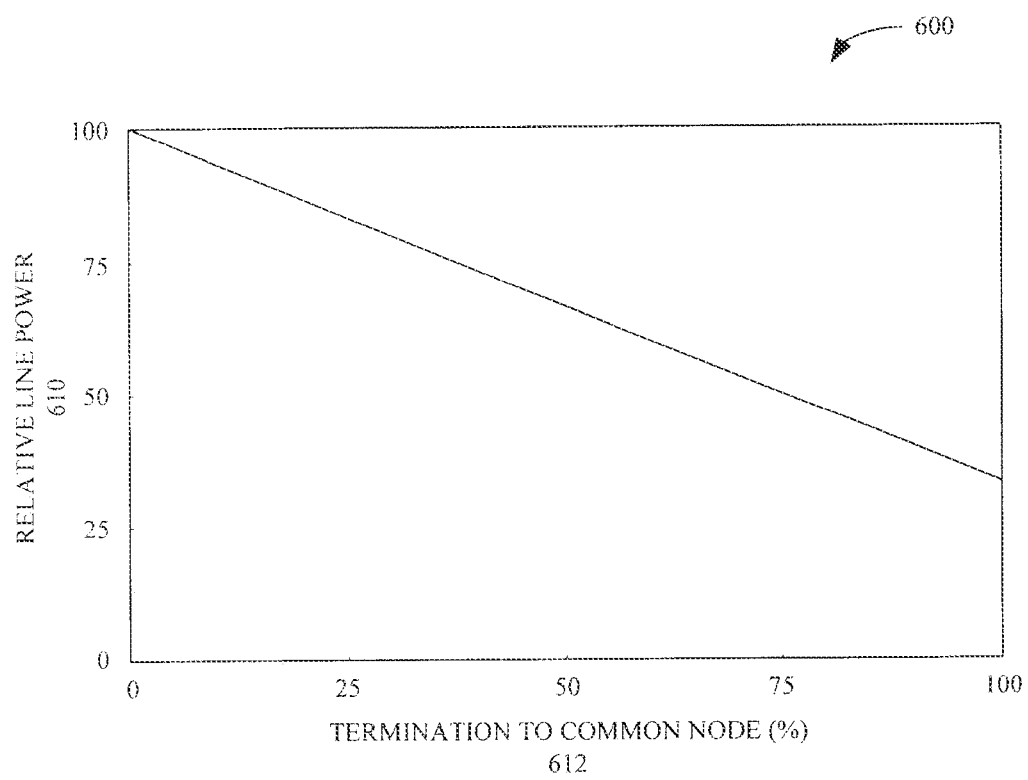
FIG. 6 is a graph of relative line power versus termination to a common node in accordance with one embodiment.

In the worst case, where the virtual ground provides no termination for the links, the equivalent impedance of the $R_2$ resistors to Vdd and ground still provides 50% termination (if $R_2=200\Omega$). FIG. 6 depicts a graph 600 of the tradeoff between relative line power 610 and termination to a common node 612 (in %) in accordance with another embodiment.

The foregoing embodiments employ the outputs from sense amplifiers SA to decode data, for example, using a look-up table or a state machine. Other embodiments decode data by considering additional sense-amplifier outputs. For example, the decoder can sample all available sense-amplifier outputs over a number of time intervals and apply the resulting samples to a trellis to determine the most probable data sequence. Viterbi decoding is one well-known algorithm for finding a most probable trellis-encoded data sequence.

In the foregoing description and in the accompanying drawings, specific terminology and drawing symbols are set forth to provide a thorough understanding of the present invention. In some instances, the terminology and symbols may imply specific details that are not required to practice the invention. For example, embodiments of the invention may be adapted for use with multi-pulse-amplitude-encoded (multi-PAM) signals.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, the claims are not limited to what is shown. For example, the foregoing embodiments depict a 4-6 coding technique. More generally, embodiments can support N-to-M coding, where M is greater than N and is at least three (including odd values for N or M). For example, encoder 122 (FIG. 1) may implement one or more of: 1-3 coding, 1.5-3 coding, 3-5 coding, 5-7 coding, 6-8 coding, 7-9 coding and 7-10 coding. The N-symbol data can be represented using all or a subset of possible N-symbol values. Furthermore, the embodiments detailed above can be replicated or combined in series, in parallel, or both, to support different input data widths (e.g., two 4-6 encoders can be logically combined to convey eight-bit data over twelve links). Moreover, some components are shown directly connected to one another while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art. For example, the foregoing codespaces provide balanced signaling, and support AC-coupled links. Other embodiments can be unbalanced, include DC-coupled links, or both. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. An integrated circuit comprising:
   interface nodes to receive a series of first parallel symbol sets over a series of first time intervals and to transmit a series of second parallel symbol sets over a series of second time intervals, wherein the first parallel symbol sets are encoded using a different codespace from the second parallel symbol sets;
   comparison circuits, each comparison circuit having first and second input terminals, coupled to respective ones of a pair of the interface nodes, and a comparison-circuit output node to provide comparison results for each of the first parallel symbol sets; and
   driver circuits, each driver circuit having an output terminal, coupled to a respective one of the interface nodes, and each driver circuit to output a respective symbol in a respective second parallel symbol set.

2. The integrated circuit of claim 1, wherein the comparison circuits include differential amplifiers; and wherein the driver circuits include single-ended amplifiers.

3. The integrated circuit of claim 1, wherein the comparison circuits include single-ended amplifiers; and wherein the driver circuits include single-ended amplifiers.

4. The integrated circuit of claim 3, wherein the comparison circuits compare received symbols to a reference voltage.

5. The integrated circuit of claim 1, wherein the integrated circuit includes a memory controller or a dynamic random access memory (DRAM).

6. The integrated circuit of claim 1, wherein the symbols in each of the first parallel symbol sets and the second parallel symbol sets include a first symbol type representative of a logic zero and a second symbol type representative of a logic one.

7. The integrated circuit of claim 6, wherein there are equal numbers of the first symbol type and the second symbol type in each symbol set of at least one of the series of the first or second parallel symbol sets.

8. The integrated circuit of claim 1, further comprising a decoder having decoder input terminals, coupled to the comparison-circuit output nodes, the decoder to decode each of the first parallel symbols sets from the corresponding comparison results.

9. The integrated circuit of claim 8, wherein the comparison circuits provide comparison results for all pairs of the input nodes.

10. The integrated circuit of claim 8, wherein there are M symbols in each symbol set; and wherein there are M(M−1)/2 comparison circuits.

11. The integrated circuit of claim 1, wherein the integrated circuit is to communicate information via half-duplex communication.

12. The integrated circuit of claim 1, wherein bandwidth associated with the series of first parallel symbol sets is the same as bandwidth associated with the series of second parallel symbol sets.

13. An integrated circuit comprising:
interface nodes to receive a series of first parallel symbol sets over a series of first time intervals and to transmit a series of second parallel symbol sets over a series of second time intervals, wherein the first parallel symbol sets are encoded using a different codespace from the second parallel symbol sets;
comparison circuits, each comparison circuit having first and second input terminals, coupled to respective ones of a pair of the interface nodes, and a comparison-circuit output node to provide comparison results for each of the first parallel symbol sets; and
multiple means for outputting the second parallel symbol sets, each means having an output terminal, coupled to a respective one of the interface nodes, and each means for outputting a respective symbol in a respective second parallel symbol set.

14. A system, comprising:
a first integrated circuit that includes:
first interface nodes to receive a series of first parallel symbol sets over a series of first time intervals and to transmit a series of second parallel symbol sets over a series of second time intervals, wherein the first parallel symbol sets are encoded using a different codespace from the second parallel symbol sets;
first comparison circuits, each first comparison circuit having first and second input terminals, coupled to respective ones of a pair of the first interface nodes, and a first comparison-circuit output node to provide first comparison results for each of the first parallel symbol sets; and
first driver circuits, each first driver circuit having a first output terminal, coupled to a respective one of the first interface nodes, and each first driver circuit to output a respective second symbol in a respective second parallel symbol set; and
a second integrated circuit, coupled to the first integrated circuit, that includes:
second interface nodes to receive the series of second parallel symbol sets over the series of second time intervals and to transmit the series of first parallel symbol sets over the series of first time intervals;
second comparison circuits, each second comparison circuit having third and fourth input terminals, coupled to respective ones of a pair of the second interface nodes, and a second comparison-circuit output node to provide second comparison results for each of the second parallel symbol sets; and
second driver circuits, each second driver circuit having a second output terminal, coupled to a respective one of the second interface nodes, and each second driver circuit to output a respective first symbol in a respective first parallel symbol set.

15. The system of claim 14, wherein the first integrated circuit includes a memory controller and the second integrated circuit includes a DRAM.

16. A method for communicating information between a first device and a second device, the method comprising:
receiving a series of first parallel symbol sets from the first device over a first series of time intervals on interface nodes, the symbols in each first parallel symbol set received on respective interface nodes;
comparing pairs of symbols on the interface nodes to determine comparison results for each of the first parallel symbol sets; and
transmitting a series of second parallel symbol sets to the first device over a second series of time intervals on the interface nodes, a respective symbol in each of the second parallel symbol sets transmitted on a respective interface node, wherein the first parallel symbol sets are encoded using a different codespace from the second parallel symbol sets.

17. An integrated circuit for coupling to bi-directional communication links, comprising:
input circuits to receive in parallel a first set of symbols from the bi-directional links;
comparison circuits coupled to the input circuits, each comparison circuit to compare a respective pair of the first set of symbols, the comparison circuits to provide comparison results corresponding to the first set of symbols;
a decoder coupled to the comparison-circuits, the decoder to decode the comparison results using a decoding technique that is based on a first codespace and to generate a first set of data bits corresponding to the first set of symbols;
an encoder to encode a second set of data bits into a codeword an encoding technique that is based on a second codespace different from the first codespace; and
driver circuits, coupled to the encoder, to output in parallel a second set of symbols corresponding to the codeword onto the bi-directional communication links.

18. The integrated circuit of claim 17, wherein the symbols in each of the first set of symbols and the second set of symbols include a first symbol type representative of a logic zero and a second symbol type representative of a logic one.

19. The integrated circuit of claim 18, wherein there are equal numbers of the first symbol type and the second symbol type in each set of symbols.

20. The integrated circuit of claim 17, wherein there are equal numbers of first and second binary states in each set for at least one of the first and second sets of symbols.

21. The integrated circuit of claim 17, wherein there are M symbols in each symbol set; and wherein there are $M(M-1)/2$ comparison circuits.

22. A method for communicating information between a first device and a second device coupled to each other by bi-directional communication links, the method comprising:
  encoding data into a codeword using an encoding technique that is based on a first codespace;
  outputting in parallel a first set of symbols corresponding to the codeword onto the bi-directional communication links;
  receiving in parallel a second set of symbols from the bi-directional communication links;
  producing comparison results by comparing pairs of the second of symbols; and
  decoding the comparison results using a decoding technique that is based second code space different from the first codespace to generate data bits corresponding to the second set of symbols.

* * * * *